US006707632B1

(12) United States Patent  
Raphael et al.

(10) Patent No.: US 6,707,632 B1
(45) Date of Patent: Mar. 16, 2004

(54) DISC DRIVE WITH SELF-CONTAINED SERVO DATA WRITING CAPABILITY

(75) Inventors: William J. Raphael, Bethany, OK (US); William J. McMartin, Oklahoma City, OK (US)

(73) Assignee: Seagate Technology LLC, Scotts Valley, CA (US)

(*) Notice: Subject to any disclaimer, the term of this patent is extended or adjusted under 35 U.S.C. 154(b) by 442 days.

(21) Appl. No.: 09/698,601

(22) Filed: Oct. 27, 2000

Related U.S. Application Data (60) Provisional application No. 60/181,026, filed on Feb. 8, 2000.

(51) Int. Cl.⁷ ................................................. G11B 21/02
(52) U.S. Cl. ......................................................... 360/75
(58) Field of Search ............................. 360/51, 53, 75, 360/77.03, 78.11

(56) References Cited

U.S. PATENT DOCUMENTS

| | | | |
|---|---|---|---|
| 5,162,955 A | 11/1992 | Burdenko | |
| 5,227,625 A | 7/1993 | Hetzler | |
| 5,268,801 A | 12/1993 | Hazel et al. | |
| 5,315,372 A | 5/1994 | Tsai | |
| 5,325,349 A | 6/1994 | Taniguchi | |
| 5,442,172 A | 8/1995 | Chiang et al. | |
| 5,485,322 A | 1/1996 | Chainer et al. | |
| 5,486,923 A | 1/1996 | Mitchell et al. | |
| 5,568,337 A | 10/1996 | Eguchi et al. | |
| 5,909,333 A | 6/1999 | Best et al. | |
| 5,930,066 A | 7/1999 | Ishizuka et al. | |
| 6,078,458 A * | 6/2000 | Fioravanti et al. | 360/73.03 |
| 6,259,576 B1 | 7/2001 | Ahn | |
| 6,304,406 B1 | 10/2001 | Douglas et al. | |
| 6,404,580 B1 * | 6/2002 | Fioravanti | 360/75 |
| 6,507,450 B1 * | 1/2003 | Elliott | 360/77.08 |

FOREIGN PATENT DOCUMENTS

GB       2011654 A      7/1979

* cited by examiner

*Primary Examiner*—David Hudspeth
*Assistant Examiner*—Mitchell Slavitt
(74) *Attorney, Agent, or Firm*—Fellers, Snider, et al.

(57) ABSTRACT

An apparatus and method for writing servo data to a rotatable disc of a disc drive, the servo data used to control the position of a read/write head adjacent the disc. An internally mounted clock head assembly provides disc angular position information by writing and subsequently reading a clock pattern to and from the disc. A radial position detection assembly identifies the radial position of the head. A control circuit controls the function and position of the head to write the servo data to the disc in response to the disc angular and head radial position information. The clock head assembly and radial position detection assembly remain contained within the disc drive during subsequent field use, and can be configured to detect the application of rotational vibration to the disc drive and to rewrite the servo data.

16 Claims, 8 Drawing Sheets

DISC DRIVE WITH SELF-CONTAINED SERVO DATA WRITING CAPABILITY

RELATED APPLICATION

This application claims priority to Provisional Application No. 60/181,026 filed Feb. 8, 2000.

FIELD THE INVENTION

This invention relates generally to the field of magnetic data storage devices, and more particularly, but not by way of limitation, to a self-contained apparatus and associated method for writing servo data to a recordable disc without use of an external reference.

BACKGROUND

Hard disc drives are used in modern computer systems to enable users to store and retrieve vast amounts of data in a fast and efficient manner.

In a typical disc drive, one or more magnetic discs are rotated at a constant high speed and accessed by a rotary actuator assembly having a plurality of read/write heads that fly adjacent the surfaces of the discs on air bearings established by air currents set up by the rotation of the discs. Each head includes a write element that selectively magnetizes data fields defined on tracks on the corresponding disc surface during a write operation, and a read element that detects the selective magnetization of the data fields during a read operation. A read/write channel and an interface circuit, responsive to the heads, are provided to transfer the data between the discs and a host computer in which the disc drive is mounted.

A closed loop digital servo system is used to control the position of the heads relative to the tracks through the application of current to a coil of a voice coil motor. The tracks are defined from servo information written to servo fields on the surfaces of the discs during manufacturing using a highly precise servo track writing procedures. The servo information is stored in a series of servo fields, the leading edges of which are radially aligned on each of the surfaces of the discs so as to define servo wedges which outwardly extend from the inner radii of the discs like spokes of a wheel. The data fields are subsequently arranged between adjacent servo fields during a disc drive formatting operation. Typical disc drives generally provide from about 30 to 90 servo wedges on each disc surface.

The servo information typically includes automatic gain control (AGC), synchronization, track address, angular position (index) and radial position information stored in associated fields, with the AGC and synchronization information providing timing and amplitude inputs, the track address information indicating the radial position of the heads, the index information indicating the angular position of the heads with respect to the discs and the position information indicating the position of the heads with respect to the center associated tracks on the discs. Thus, during normal disc drive operation, the servo information is periodically sampled to enable the servo system to control the position of the heads to properly effectuate the transfer of data between the data fields and the host computer.

Because servo tracks contain the information necessary to locate, write or read data on the recording member, the servo tracks are typically written during manufacture by a separate servo track writer apparatus. Servo track writers include components that control and monitor the radial and angular position of the read/write heads in the absence of preexisting address information by relying on internal or external reference position references.

The angular position of the rotating disc with respect to the read/write head is typically monitored through use of an externally mounted clock head assembly. The clock head is typically inserted through an aperture in the basedeck of the disc drive (in a clean room environment) so as to be in close proximity with the surface of the disc at its outer diameter. Once located, a control circuit instructs the clock head to write a clock track on the disc surface while the disc is rotating at a selected speed. The clock track comprises a sequence of alternating pulses at a selected frequency which are subsequently read by the clock head to generate a reference clock signal used to control the timing of the servo track writing operation.

Once the clock track has been written, the servo track writer can adjust the radial position of the read/write heads. There have been a variety of approaches to radial positioning in servo track writing. One such approach involves the use of a mechanical "push-pin" assembly. A push-pin servo track writer includes a pusher pin which extends upwardly through an aperture in the basedeck in order to engage the actuator arms. In many embodiments, the pusher pin advances the actuator arms in response to a closed-loop servo control based on a master encoder disc located on the external servo track writer. Alternatively, the closed-loop servo control of the pusher pin can be established through use of a laser-based detector. When a laser detector is employed, a laser mounted on the servo track writer monitors the position of a reflective surface located on the actuator assembly inside the disc drive relative to an optical detector located inside the servo track writer.

While effective, push-pin servo track writers require that an aperture be formed in the basedeck. Mechanical push-pin servo track writers are also limited in their accuracy by adverse mechanical resonance. A less invasive approach has been suggested whereby a control circuit directs the application of current to the internal voice coil motor ("VCM") to position the read/write heads in reference to feedback generated by a conventional optical detector located on the servo track writer. This "optical" pusher pin approach benefits from having fewer mechanical assemblies and from a reduction in the number of necessary apertures in the disc drive.

Despite the aforementioned advances, servo track writers of the present generation are expensive to manufacture, time intensive and require that servo track writing be performed in clean room environment. In light of these prior art deficiencies, a need continues to exist for an improved method and apparatus for writing servo data in a disc drive.

SUMMARY OF THE INVENTION

The present invention is directed to a self-contained apparatus and associated method for writing servo information to a disc drive.

In accordance with a preferred embodiment, the disc drive comprises a rotatable disc upon which servo information is stored, the servo information used to control the position of a rotary actuator, which supports a read/write head adjacent the disc.

An internally mounted clock head assembly provides angular position information by writing and reading a clock track signal on a portion of the disc not accessed during user operation. The clock track signal comprises a series of alternating pulses occurring at a selected frequency.

A radial position detection assembly also contained within the disc drive provides the radial position information. The radial position detection assembly is used to register movement of the rotary actuator in the absence of preexisting servo information. The radial position detection assembly comprises a light source, a detector and a reflective member with diffraction grating. Preferably, the reflective member is adhered to a rear portion of the rotary actuator.

The servo information is written to the disc by connecting the disc drive to a host computer, writing the clock track signal, calibrating the radial position detection assembly and writing the servo information in relation to the angular and radial position information output by the respective clock track and radial position detection assemblies.

These and various other features as well as advantages which characterize the present invention will be apparent from a reading of the following detailed description and a review of the associated drawings.

BRIEF DESCRIPTION OF THE DRAWINGS

FIG. 8 is a functional block diagram depicting the control circuitry of the disc drive of claim 1.

DETAILED DESCRIPTION

Figure 1:
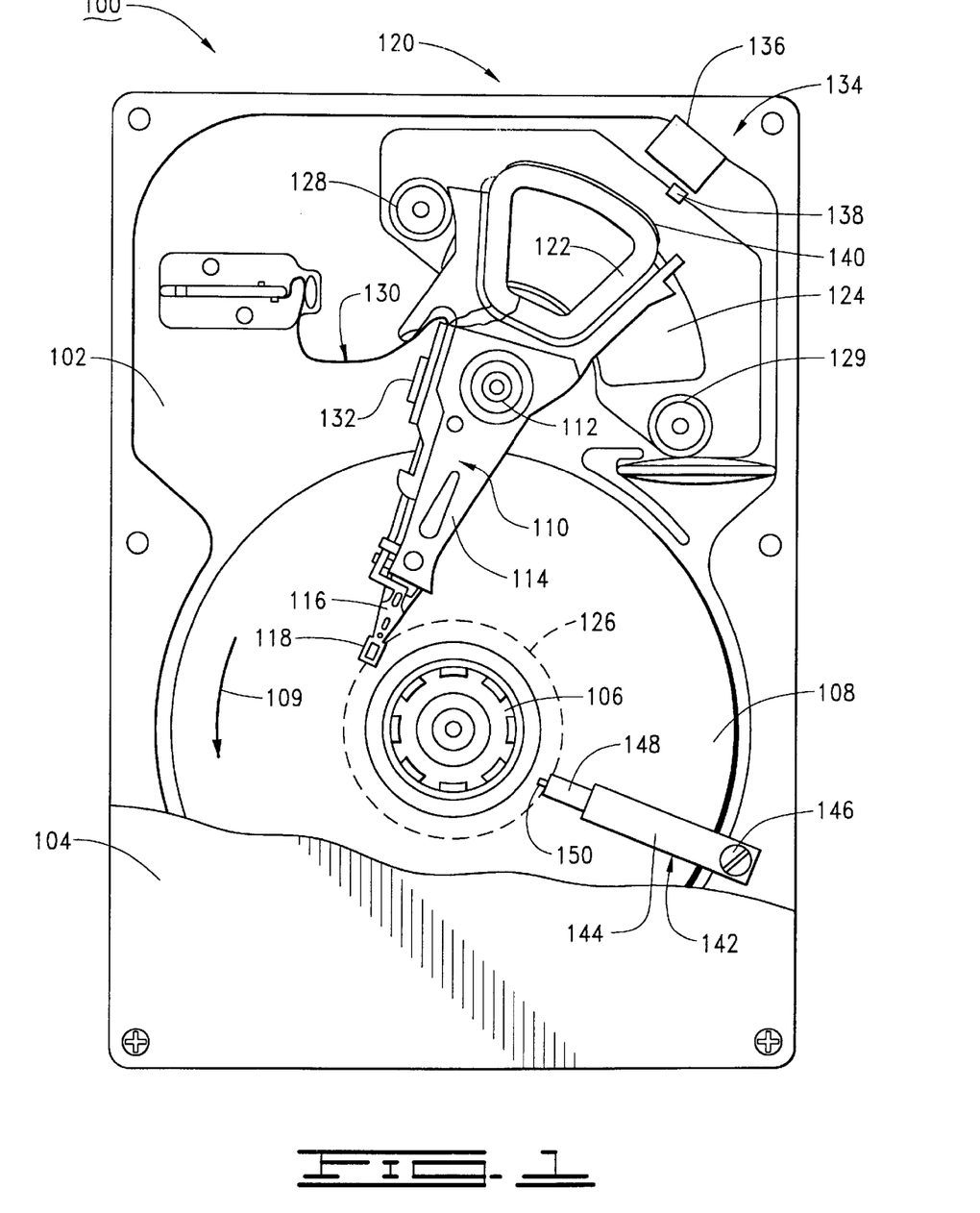
FIG. 1 is a top plan view of a disc drive constructed in accordance with preferred embodiments of the present invention.

In order to provide a detailed description of various preferred embodiments of the present invention, reference is first made to FIG. 1, which provides a top plan view of a disc drive 100 of the type used to interface with a host computer to magnetically store and retrieve user data. The disc drive 100 includes a base deck 102 to which various components of the disc drive 100 are mounted. A top cover 104 (shown in partial cutaway fashion) cooperates with the base deck 102 to form a sealed environment for the disc drive.

A spindle motor (shown generally at 106) is provided to rotate a plurality of axially-aligned, rigid, magnetic recording discs 108 at a constant velocity (in thousands of revolutions per minute) as indicated by vector 109. User data are written to and read from tracks (not designated) on the discs 108 through the use of an actuator assembly 110, which rotates about a bearing shaft assembly 112 positioned adjacent the discs 108.

The actuator assembly 110 includes a plurality of rigid actuator arms 114 which extend toward the discs 108. A plurality of flexible suspension assemblies 116 are attached to the distal end of the actuator arms 114. Mounted at the distal end of each of the flexible suspension assemblies 116 is a head 118 which includes a slider assembly (not separately designated) designed to fly in close proximity to the corresponding surface of the associated disc 108. The heads 118 are preferably characterized as magneto-resistive (MR) heads each having a thin-film inductive write element and an MR read element.

For reference, it will be understood that the radial position of the heads 118 is controlled through the use of a voice coil motor (VCM) 120, which includes a coil 122 as well as a permanent magnet 124 which establishes a magnetic field in which the coil 122 is immersed. A second magnetic flux path is disposed above the permanent magnet 124, but has not been shown for purposes of clarity. The heads 118 are moved across the surfaces of the discs 108 through the application of current to the coil 122. When the disc drive 100 is not in use, the heads 118 are moved over and come to rest upon a landing zone 126 near the inner diameter of the discs 108. The actuator assembly 110 is then secured using a latch assembly (not shown). A first crash stop 128 and a second crash stop 129 are used to limit the motion of the actuator assembly 110 at the limits of its full stroke. A flex assembly 130 provides the requisite electrical connection between the actuator assembly 110 and a printed circuit board assembly mounted below the basedeck.

The flex assembly 130 includes a preamplifier/driver circuit 132 ("preamp") which applies current to the heads 118 to read and write data.

FIG. 1 also shows a radial position detection assembly 134 secured to the basedeck 102 in close proximity with the coil 122. The radial position detection assembly 134 generally includes a fixed light source 136, a detector 138 and a reflective member 140 that is attached to the coil 122 in close proximity to the detector 138.

Also shown is a clock head assembly 142 that includes a support arm 144 which extends towards the discs 108 and is secured to the basedeck 102 at its proximal end with a mounting screw 146. A clock head flexure 148 extends from the distal end of the support arm 144 and supports a clock head 150 in close proximity the landing zone 126. It will be understood that the aerodynamic design of the clock head 150 enables it to "fly" over the landing zone 126 when subjected to air currents caused by the rotation of the discs 108. Other radial locations for the clock head 150 can be used, as desired.

Figure 2:
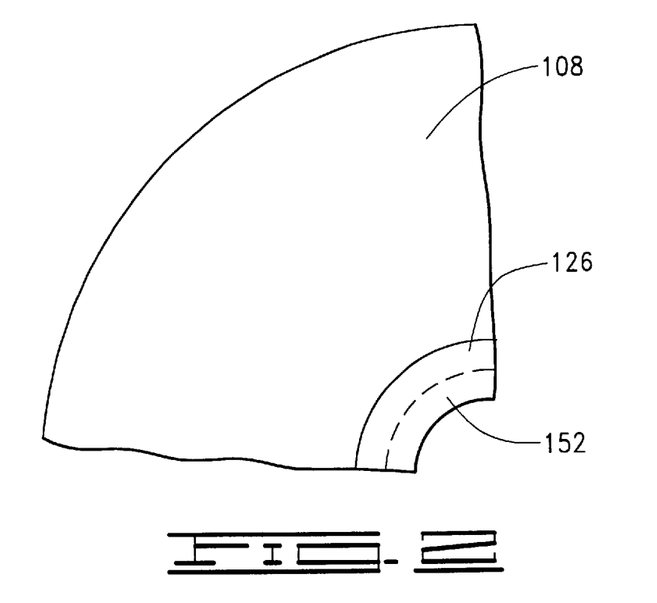
FIG. 2 is representation of a portion of a disc of the disc drive of FIG. 1 illustrating the orientation in which the clock track is written to the disc.

Turning now to FIG. 2, the landing zone 126 is depicted as a region near the inner diameter of the disc 108. It is well understood in the art of disc drive manufacture that texturing a region of the disc surface can eliminate problems associated with head-to-disc stiction. As such, it has become common practice to texture a region of the disc surface. Although FIG. 2 depicts the landing zone 126 at the inner diameter of the disc 108, it will be understood that the landing zone 126 can also be located on an outer diameter.

To maximize the amount of disc area available for the storage of user data, a clock track 152 is preferably located within the landing zone 126. The clock track 152 comprises a sequence of alternating pulses at a selected frequency which are written and subsequently read by the clock head 150 to generate a reference clock signal used to control the timing of the servo track writing operations.

Figure 3:
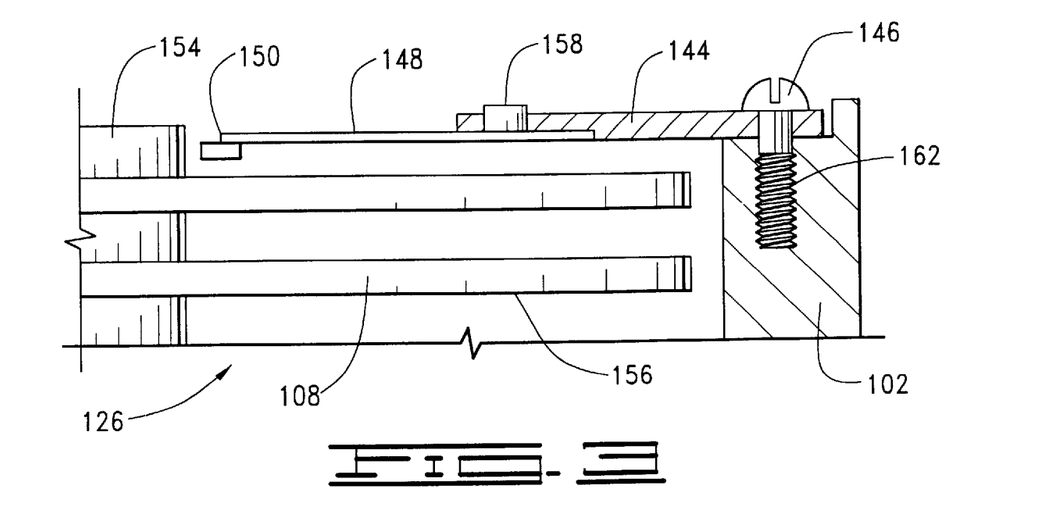
FIG. 3 is a side cross-sectional view of a clock head assembly constructed in accordance with the disc drive of FIG. 1.

Turning now to FIG. 3, shown therein is an elevational cross-sectional representation of the clock head assembly 142 of FIG. 1, in conjunction with relevant portions of the disc drive 100. Particularly, FIG. 3 shows the discs 108 of the disc drive 100 to be separated by spacers (portions of which being designated at 154). As previously discussed, the clock head assembly 142 is radially aligned with the landing zone 126 (set forth in FIG. 3 via dotted line), with remaining portions of the surfaces of the discs 108 comprising data recording surfaces (identified generally at 156).

The clock head flexure 148 is preferably secured to the support arm 144 using a conventional swaging interconnection 158. The mounting screw 146 extends into a corresponding threaded hole 160 in the base deck 102 to secure the support arm 144 to the base deck 102. The support arm 144 is preferably provided with a slot 162 through which the mounting screw 146 extends, accommodating manufacturing tolerances during assembly. A plurality of signal wires (not shown) are preferably directed from the clock head assembly 142 to the flex circuit assembly 130 to enable electrical communication with a host computer (not shown). Alternatively, the clock head 150 signal wires can be routed through an aperture in the basedeck 102 to a corresponding connector on the printed circuit board assembly. Of course, the configuration set forth in FIG. 3 is for purposes of illustrating a preferred embodiment, and is not limiting to the scope of the invention as claimed below.

Figure 4:
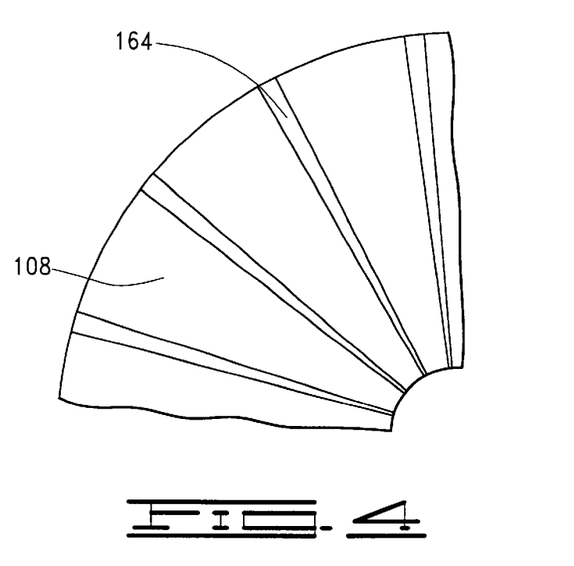
FIG. 4 is representation of a portion of a disc of the disc drive of FIG. 1 illustrating the orientation in which servo tracks are written to the disc.
Figure 5:
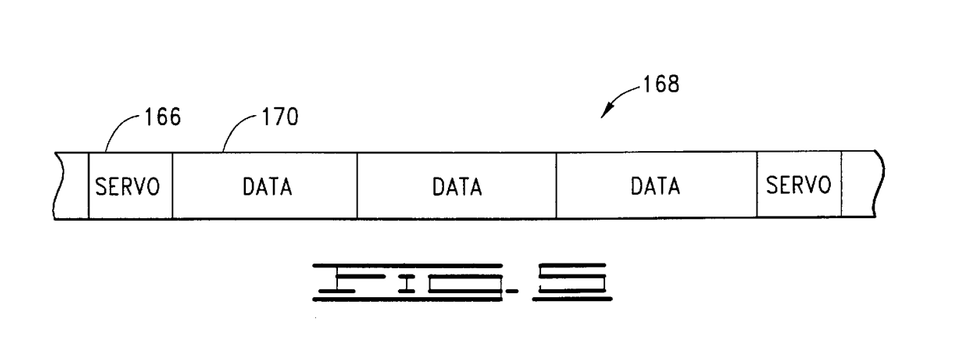
FIG. 5 is graphical representation of the interspersion of servo and data tracks on a disc of the disc drive of FIG. 1.

Turning now to FIGS. 4 and 5, shown therein is a general illustration of the manner in which servo data are written in accordance with the present invention. A plurality of servo wedges (one of which is identified at 164), extend from the inner to the outer radius of the disc 108 and comprise the servo data used by servo control circuitry located on the printed circuit board assembly to control the position of an associated head (not shown) in relation to the disc surface. Each wedge 164 comprises a plurality of adjacent servo fields 166 which are radially aligned to define each of the tracks on the disc surface (a portion of one such track is represented at 168 in FIG. 5). User data fields 170 ("data sectors") are defined between adjacent servo fields 166 during a disc drive formatting operation. It will be recognized that the data sectors 170 are typically much longer than the servo fields 166 in order to maximize data storage capacity, so that aspect ratios and relative lengths of the fields in FIG. 5 are not represented to scale.

Figure 6:
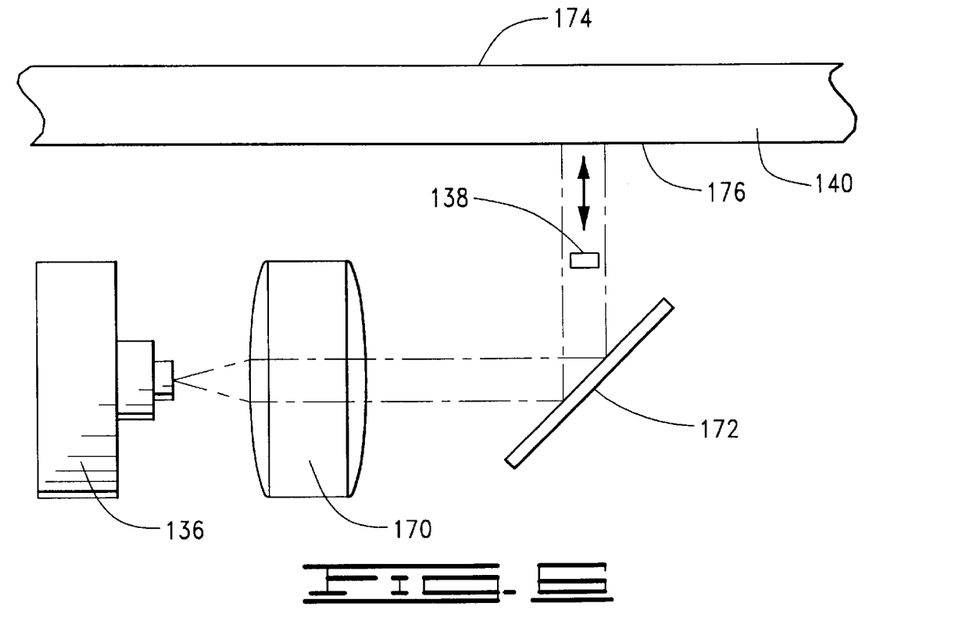
FIG. 6 is a top plan view of a radial position detection assembly constructed in accordance with the disc drive of FIG. 1.

Turning now to FIG. 6, shown therein is a top diagramatic view of the radial position detection assembly 134. As previously mentioned the radial position detection assembly 134 is used to detect movement of actuator assembly 110 relative to the radial position detection assembly 134, which is preferably stationarily mounted to the basedeck 102. The radial position detection assembly 134 includes the light source 136, the detector 138 and the reflective member 140. Preferably, the light source 136 comprises a semiconductor laser capable of generating a monochromatic coherent light at a selected wavelength. Light from the light source 136 is collimated by a lens 170 before being redirected towards the reflective member 140 by a mirror 172.

In a preferred embodiment, the reflective member 140 comprises a flexible, reflective substrate having an adhesive first side 174 that is secured to a portion of the coil 122, although other locations on the actuator assembly 110 can be utilized as desired. Generally, higher resolution will be obtained at locations farther from the actuator pivot axis. The second, outwardly facing side of the reflective member 140 preferably has diffraction grating 176 along the length of the reflective member 140. The interrelated geometry of the actuator assembly 110 and the reflective member 140 affects the resolution obtainable by the radial position detector 138. More particularly, consideration must be given to the relationship between the range of arcuate motion of the heads 118 to the corresponding length of the reflective member 140 (see FIG. 1). Preferably, the reflective member 140 has a length substantially equivalent to the length of the servo wedge 164, thereby creating a one-to-one ratio of movement. It is also preferred that the reflective member 140 be secured to a rear portion of the coil 122 in close proximity with the detector 138. It will be noted that a variety of diffraction grating configurations are available, including gratings that use "reflecting" and "nonreflecting" lines.

Figure 7:
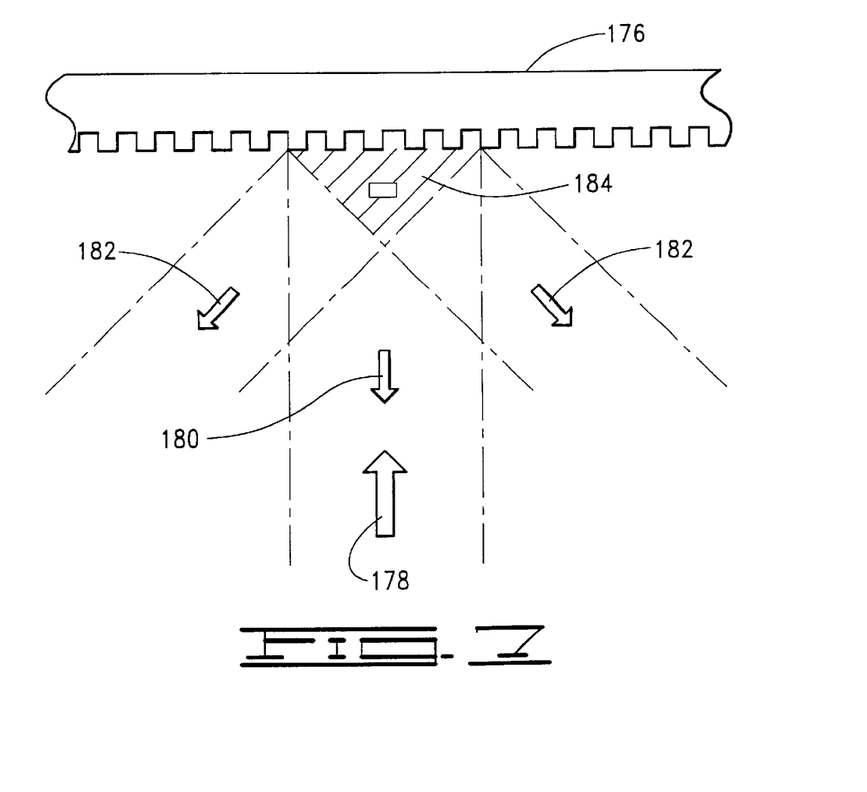
FIG. 7 is a top diagramatic view of a preferred diffraction of light incident to the diffraction grating constructed in accordance with the disc drive of FIG. 1.

As shown in FIG. 7, light (designated at arrow 178) incident to the diffraction grating 176 is refracted into several positive and negative orders of refraction. Preferably, the geometry of the diffraction grating and the wavelength of the light are selected to minimize the zeroth order of refraction (arrow 180) and to maximize the positive and negative first orders of diffraction (arrows 182). The minimization of the zeroth order of refraction can be accomplished by employing a grating depth of one-quarter wavelength of the light as well as by using the step profile shown in the diffraction grating 176.

The region in front of the diffraction grating 176 where there is only interference between positive and negative orders of diffraction is termed a region of natural interference. For example, the region of natural interference for the positive and negative first orders is indicated as the cross-hatched region 184. In the first order region of natural interference 184, the resulting interference patterns ("fringes") are everywhere sinusoidal and have a periodicity that is twice that of the diffraction grating 176. To produce well defined interference fringes, the diffraction grating 176 and light characteristics should be selected such that a portion of the first order region of natural interference 184 is substantially free from higher orders. Such a portion of the first order region of natural interference 184 is an ideal location for the placement of the detector 138.

In a preferred embodiment, the detector 138 comprises a poly-phase periodic detector having a period equal to one-half of the period of the diffraction grating 176. The detector preferably comprises an array of individual photodiodes, with each photodiode corresponding to a portion of the interference fringe. For example, the detector 138 could be constructed such that three arrays, each containing four photodiodes, produce triplicated quadrature signals, where each signal (A,B,C and D) is representative of one-quarter (90°) of each fringe.

Although preferred embodiments of the detector 138 and reflective member 140 have been disclosed above, one of ordinary skill in the art will understand that additional and alternative configurations exist and are within the scope of the present invention. For instance, in addition to the configuration disclosed above, U.S. Pat. No. 5,486,923 issued Jun. 23, 1996 to Mitchell et al. ("Mitchell '923"), incorporated herein by reference, discloses several suitable and preferable alternative constructions for the detector 138 and reflective member 140. While Mitchell '923 uses an externally mounted detector and reflective member, the reference is nevertheless useful as a source for additional discussion of the optics and electronics underlying modern diffraction grating-based optical detectors.

Turning now to FIG. 8, shown therein is a simplified functional block diagram of relevant portions of the control circuitry supported on the disc drive printed circuit board assembly, including a read/write channel 186, a servo control circuit 188 with programmable digital signal processor (DSP) 190, top level control processor 192 with associated memory 194, and interface control electronics 196.

The read/write channel 186 operates as a communication channel to encode input data to be written to the discs 108 and to decode amplified readback signals from the preamp 132 to reconstruct data retrieved from the discs 108.

The servo control circuit 188 operates to demodulate head position and velocity from the servo data from the servo fields 164 (FIG. 5) and apply currents to the coil 122 to rotate the actuator assembly 110 accordingly. The servo control circuit 188 further provides drive currents to the spindle motor 106 to rotate the discs 108 at operational speed during drive operation. For reference, it is contemplated that the servo control circuit 188 rotates the spindle motor 106 at about 10,000 revolutions per minute (rpm).

The control processor 192 provides top level control for the disc drive 100 in accordance with programming steps stored in processor memory 194 and host commands provided by a host computer 198.

The interface electronics 146 includes a host interface (I/F) circuit 200 which controls the transfer of data and commands between the disc drive 100 and the host 198. A buffer 202 (with cache memory 204) temporarily stores data that are being transferred between the host and the discs 108. More particularly, during a write operation the host loads the buffer 202 with data to be written to the discs 108, and the loaded data are sequentially passed to the read/write channel 186 for processing. During a read operation, the read/write channel 186 sequentially loads the buffer 202 with data retrieved from the discs 108 for subsequent transfer to the host. A buffer control circuit 206 controls the flow of data in and out of the buffer 202.

An error correction circuit (ECC) 208 applies on-the-fly error detection and correction algorithms to the retrieved data to correct detected errors in the retrieved data in the buffer 202. A disc control circuit 210 sequences the read and write operations by the read/write channel 186. A processor interface (I/F) 212 provides a communication path with the control processor 192.

For purposes of the present discussion, it will be contemplated that the interface electronics 212 uses the Small Computer System Interface (SCSI) host interface protocol, although such is not limiting to the scope of the invention as claimed below. Hence, the host I/F 200 includes a command register (CR) 214 that can concurrently store up to 64 pending access commands from the host. One type of access command is a write command from the host 198 to write a block of data loaded into the buffer 202 by the host to a selected sector 164 (FIG. 4) on a selected disc surface; another type of access command is a read command from the host 198 to retrieve the contents of a selected sector 164 (FIG. 4) on a selected disc surface to the buffer 202 for subsequent transfer to the host 198. It will be noted that the host employs logical block addresses (LBAs) to identify the desired data sectors 170, and the control processor 192 converts each LBA to a physical block address (PBA) to identify the cylinder, disc surface and angular location of the desired sector.

The control processor 192 also controls the operation and calibration of the radial position detection assembly 138. A radial position detector circuit 216 is used to condition the raw analog signal output by the detector 138 into a digital representation of the interference fringes produced by the diffraction grating 176 as it passes before the light source 136 and detector 138.

As disclosed in Mitchell '923, the output from a four-channel detector 138 can be reduced to a two-channel analog signal to remove any direct current (DC) offset. An analog-to-digital (A/D) converter located within the radial position detection circuit 216 then digitizes the normalized two-channel signal. The radial position detection circuit 216 outputs the digitized signal to the control processor 192 where the signal is used to count the number of fringes encountered during the calibration of the radial position detector assembly 134. During calibration, the total number of fringes detected during calibration is correlated to the total number of tracks required for servo track writing to produce a fringe-to-track ratio.

For example, if the disc 108 is to contain 72,000 half-tracks upon which servo information is to be written and 50,000 interference fringes are counted during calibration, a fringe-to-track ratio of 1.44:1 exists. The fringe-to-track ratio is preferably stored in a table format within the control processor memory 194. Significantly, in this example, there are more half-tracks than interference fringes. As such, a higher resolution is required of the detector 138 to enable accurate positioning of the heads 118.

In the near future, the pitch of a half-track written in a servo track writing operation may be as small as 0.15 micrometers ($\mu$m), which corresponds to $5.9 \times 10^{-6}$ inches (in.). The use of detector 138 having multiple photodiodes enables the radial position detection assembly 134 to optically lock onto a number of interpolated positions within a single fringe. Modern interpolation techniques are capable of producing a position resolution of 12 bits. If the diffraction grating 176 with a period of 20 $\mu$m (7.9 $\times 10^{-6}$ in.) produces a fringe having a period of 10 $\mu$m ($3.9 \times 10^{-6}$ in.), 12 bit interpolation of the fringe could produce reference positions at 0.04 $\mu$m ($1.5 \times 10^{-6}$ in.) intervals.

The control processor 192 can be used to interpolate a single fringe length to produce a number of high-resolution "reference positions." The control processor 192 then produces a reference position-to-track relation based on a correlation of the high-resolution reference position information with the known physical geometry of the actuator assembly 110 and discs 108. The high-resolution reference position-to-track information preferably replaces the fringe-to-track ratio stored within the processor memory 194. The method of interpolation employed will depend on the requirements of a given application but may include, for example, mathematical or geometric interpolations.

To accurately generate the reference position-to-track ratio, it is necessary to match locations on the reflective member 140 that correspond to the position of the actuator assembly 110 at contact with the first crash stop 128 and the second crash stop 129. Preferably, a current sensor provisioned within the servo circuit 188 monitors the current being applied to the actuator coil 122. At contact with one of the crash stops, the current supplied to the coil 122 will increase, signaling a limit of movement for the actuator assembly 110. This information is output to the control processor 192, which then resets the radial position detection circuit 216 and commands the servo circuit 188 to null the current being applied to the coil 122. The detector 138 will also be able to detect the crash stops 128, 129 due to a lack of further movement of the grating.

The clock head assembly 142 is controlled by a clock head control circuit 218. The control processor 192 outputs a frequency-specific write command to the clock head control circuit 220. The write command is transferred from the clock head control circuit 220 to the clock head assembly 142 as a series of alternating pulses indicative of the selected frequency. The clock track 152 is then readback by the clock head 150 which outputs a digital timing signal to the control processor 192 representative of the analog clock track signal.

Figure 9:
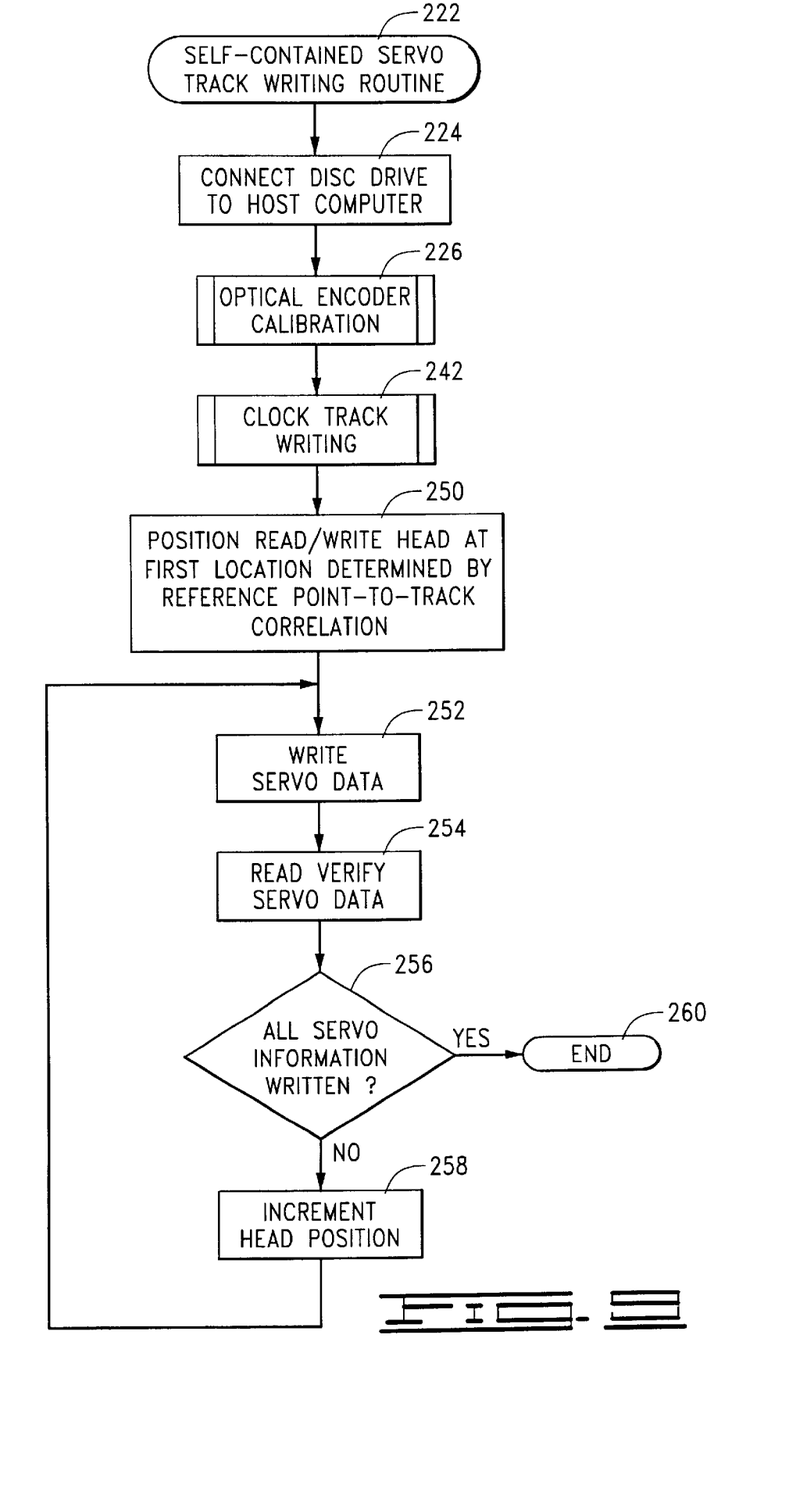
FIG. 9 is a process flow diagram for a self-contained servo track writing routine for the disc drive of claim 1

Turning now to FIG. 9, shown therein is a graphical flowchart of a self-contained servo track writing routine 222. The servo track writing routine 222 begins at step 224 by connecting the disc drive 100 to the host computer 198. Significantly, because the clock head assembly 142 and radial position detection assembly 134 are preferably provisioned within the disc drive 100, the disc drive 100 can be fully assembled before attaching the disc drive 100 to the host 198 for servo track writing. The disc drive 100 is connected to the host 198 using conventional SCSI and electrical power adapters. Preferably, the host 198 is designed to accommodate a plurality of disc drives 100 for simultaneous servo track writing procedures.

Figure 10:
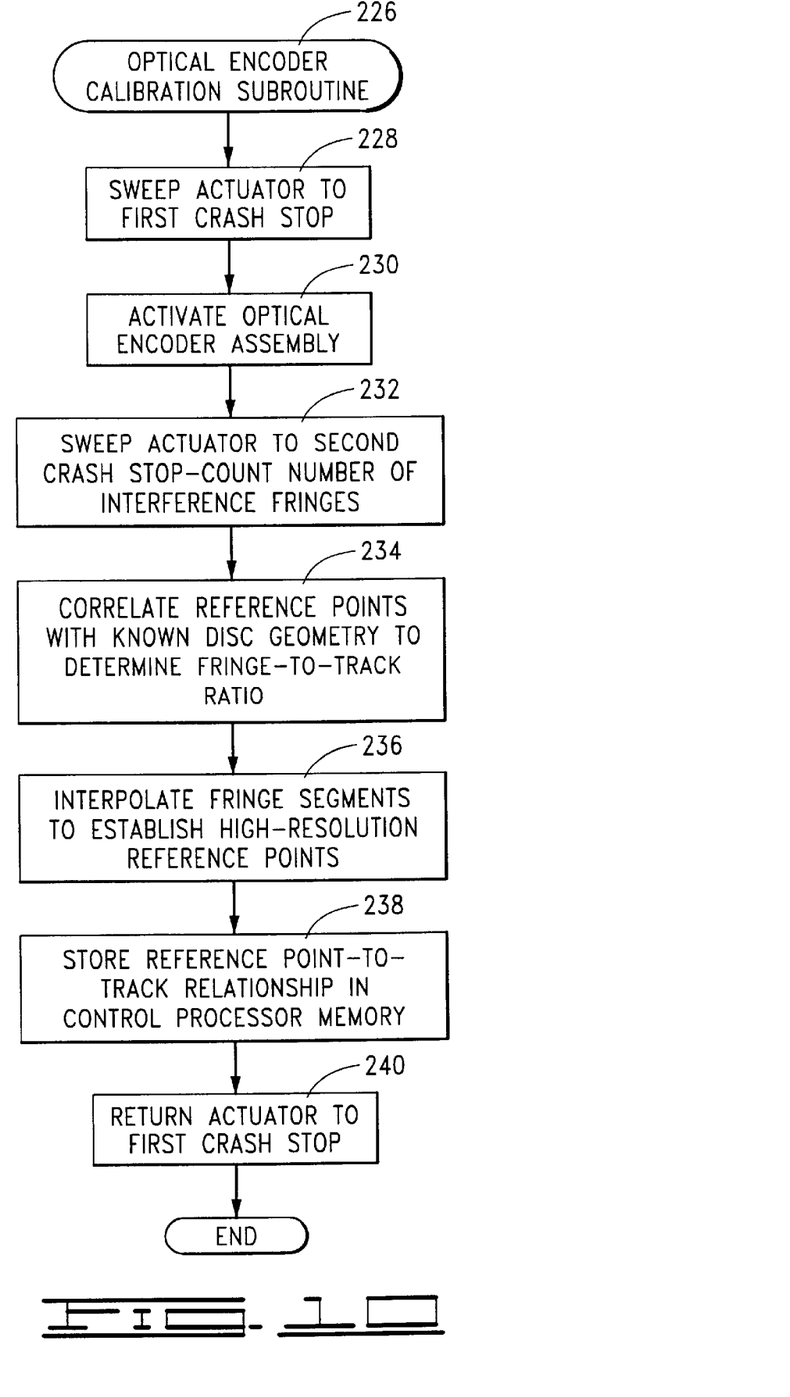
FIG. 10 is a process flow diagram showing a radial position detection assembly calibration subroutine of the servo writing routine of FIG. 9.

Next, the host 198 requests a radial position detection assembly calibration subroutine 226, which is more fully detailed in FIG. 10. Preferably, the programming associated with the radial position detection assembly calibration subroutine 226 is contained within the control processor memory 194. Alternatively, the same programming could be stored within the host 198.

With reference now to FIG. 10, the radial position detection assembly calibration subroutine 226 begins at step 228 by sweeping the actuator assembly 110 to the first crash stop 128. At contact, the coil sensor contained within the servo circuit 188 signals that the actuator assembly 110 has reached its first limit of movement. In response to the output from the coil sensor, the control processor 192 nulls the current being applied to the coil 122. Subsequently at step 230, the control processor activates the radial position detection assembly 134 by sending an appropriate current to the light source 136.

Next, at step 232, the control processor 192 commands the servo circuit 188 to rotate the actuator assembly 110 to the second crash stop 129. As the actuator assembly 110 is being rotated, the reflective member 140 and diffraction grating 176 are exposed to the light emitted from the light source 136. The resulting interference fringes are registered and output by the radial position detection assembly 134 as analog sinusoidal signals. The radial position detection circuit 216 conditions the output of the radial position detection assembly 134 by removing any DC offset and by digitizing the resulting signal, which is then sent to the control processor 192. The control processor 192 counts the number of interference fringes detected during the sweep of the actuator assembly 110. The current sensor signals the control processor 192 when the second crash stop 129 is reached, at which time the control processor 192 nulls the currents being applied to the coil 122 and the light source 136.

At step 234, the control processor 192 correlates the counted number of interference fringes with the known physical dimensions of the servo tracks 164 and disc 108 to produce the fringe-to-track relationship. In other words, the fringe-to-track relationship defines a physical length for an interference fringe as a function of known disc geometry. At step 236 the control processor 192 generates a number of high-resolution "reference positions" by interpolating the fringe measurement determined by the fringe-to-track ratio.

Finally, at step 240, the servo processor 188 returns the actuator assembly 110 to the first crash stop 128. It will be understood to one of ordinary skill in the art that the above steps in the radial position detection assembly calibration subroutine 226 could be ordered differently and may include additional steps inherent to the art which are not separately disclosed. At the close of the radial position detection assembly calibration subroutine 226, the process returns to the self-contained servo track writing routine 222 shown in FIG. 9. The routine continues with a clock track writing subroutine 242, which is detailed more fully in FIG. 11.

Figure 11:
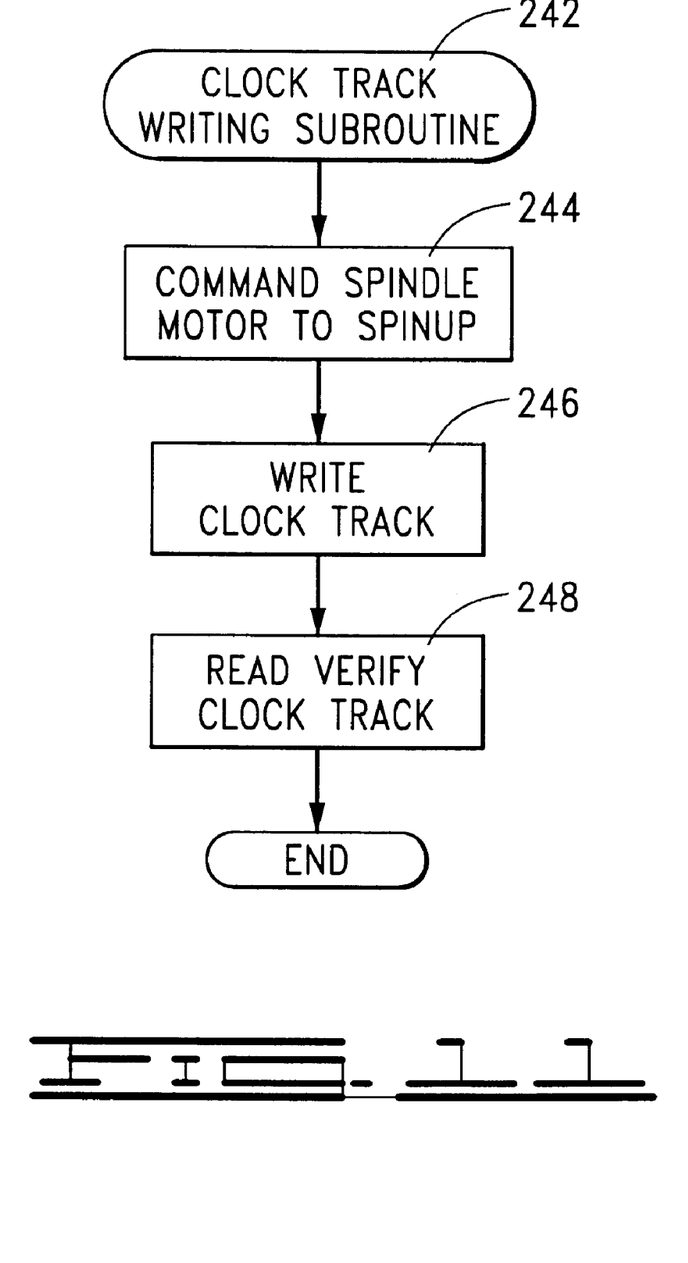
FIG. 11 is a process flow diagram showing a clock track writing subroutine of the servo writing routine of FIG. 9.

Now referring to FIG. 11, the clock track writing subroutine 242 begins at step 244 with the servo circuit 188 commanding the spindle motor 106 to spin the discs 108. At step 246 the control processor 192 directs the clock head control circuit 218 to write the clock track 152 at a specified frequency. The clock track writing subroutine 242 is completed at step 248 by read-verifying the clock track 152.

Next, the servo track writing process returns to the main routine shown in FIG. 9 and continues at step 250 by positioning the read/write heads at a first radial location determined in relation to the reference position-to-track ratio. More particularly, upon receiving a command from the host 198 to advance the heads a specified distance to a first servo track, the control processor applies the reference position-to-track ratio and calculates the number of complete fringes and interpolated positions that correspond to the desired movement of the heads 118. The control processor 192 then activates the radial position detection assembly 134 and applies current to the coil 122 to move the rotary actuator. As the actuator assembly 110 rotates, the control processor 192 Counts the number of interference fringes and interpolated positions registered by the radial position detection assembly 134. When the summed number of fringes and interpolated positions corresponds to the desired radial distance, the servo control 188 stops the movement of the heads 118.

Next, at step 252 the servo control 188 directs the head 118 to write servo data on the selected track. There are numerous methods for writing servo data to discs, all of which are contemplated as within the scope of the present invention. In a preferred embodiment, one complete cylinder of servo fields 164 are written during step 252 before readback verification takes place. At step 254, the servo control 188 verifies the servo data written in the previous step, as desired. Once verification is completed, decision step 256 determines whether all of the servo data have been written to the discs 108; if not, the routine continues to step 258 wherein the head position is incremented to prepare the heads to write the next cylinder of servo data, and the routine returns to step 252. Once all of the servo data have been written to the discs 108, the routine passes from the decision step 256 to end at step 260.

It will now be clear that the present invention, as embodied herein, provides several important advantages over the prior art. By providing the disc drive with self-contained angular and radial position detection and control capabilities, the need for separate servo track writing (STW) stations is completely eliminated. Instead, after fully assembling the disc drive 100, the drive can be placed in a rack (along with a number of additional identical drives) and, under host computer control via a suitable network, instructed to proceed with self-writing of the servo data fields 166. The drive can next be immediately formatted to form the user data fields 170, followed by parametric configuration and manufacturing performance and burn-in testing. This presents substantial cost savings in terms of both manpower and equipment, and reduces bottlenecks in the manufacturing process, which is especially important in high volume manufacturing environments where tens of thousands of drives are assembled each day.

Furthermore, the inclusion of the internal clock head 150 and the radial position detection assembly 134 provides two independent sources to detect the external application of rotational vibration to the disc drive 100. That is, the internal clock head 150 can detect changes in disc speed, and the detection assembly can detect relative movement of the actuator and the base deck. Detection signals from either or both of these sources may be readily employed to generate compensation signals that may be fed forward to the servo control circuit 188 to reduce off-track position error. Such techniques are discussed, for example, by U.S. Pat. No. 6,304,406 issued Oct. 15, 2001 to Douglas et al., assigned to the assignee of the present invention and incorporated herein by reference.

Finally, it is contemplated that the disc drive can be configured to completely rewrite the servo data in the field, a capability not heretofore possible in the prior art.

In view of the foregoing, it will be recognized that the present invention is directed to a self-contained apparatus and associated method for writing servo data to a rotatable disc in a disc drive.

In accordance with preferred embodiments, a disc drive (such as 100) includes a rotatable disc (such as 108) upon which wedges of servo data (such as 164) are written.

The disc drive 100 also includes a radial position detection assembly (such as 134) in close proximity with a reflective member (such as 140). The radial position detection assembly 134 comprises a detector (such as 138) and a light source (such as 136). The reflective member 140 is provisioned on an actuator assembly (such as 110) and includes diffraction grating (such as 176). The disc drive 100 further includes a permanently mounted clock head assembly (such as 142) which comprises a clock head (such as 150).

Also included within the disc drive 100 is a printed circuit board assembly upon which are mounted control circuitry (such as 192, 188, 216 and 218).

It will be clear that the present invention is well adapted to attain the ends and advantages mentioned as well as those inherent therein. While a presently preferred embodiment has been described for purposes of this disclosure, numerous changes may be made which will readily suggest themselves to those skilled in the art and which are encompassed in the spirit of the invention disclosed and as defined in the appended claims.

What is claimed is:

1. A disc drive having a rotatable disc to which the disc drive self-writes servo data without external reference, the servo data defining tracks on the disc and used to control the position of a rotary actuator, the rotary actuator configured for pivotal movement and supporting a read/write head adjacent the disc, the disc drive comprising:

a clock head assembly, contained within the disc drive, which outputs an angular position signal indicative of the angular position of the rotatable disc, the clock head assembly remaining at a fixed radius of the disc irrespective of rotary movement of the rotary actuator;

a radial position detection assembly, contained within the disc drive, which outputs a radial position signal indicative of radial movement of the rotary actuator relative to the disc; and a servo track writing control circuit, which controls the function and position of the read/write head to write servo information in relation to the angular and radial position signals, wherein the clock head assembly and the radial position detection assembly remain contained within the disc drive during subsequent field use of the disc drive by a user.

2. The disc drive of claim 1 wherein the radial position detection assembly comprises:

a light source which emits a quantity of light;

a reflective member; and a detector which receives a quantity of reflected light from the reflected member and outputs a radial position signal indicative of the reflective member relative to the detector.

3. The disc drive of claim 1, wherein the servo track writing control circuit is mounted to a printed circuit board assembly attached to the disc drive before servo track writing.

4. The disc drive of claim 1, wherein the clock pattern is written to a texturized landing zone upon which the head comes to rest when the disc drive is deactivated.

5. The disc drive of claim 2, wherein the light source comprises a semiconductor laser which outputs coherent light at a selected wavelength.

6. The disc drive of claim 2, wherein the reflective member comprises a flexible, reflective substrate having first and second sides.

7. The disc drive of claim 6, wherein the first side of the reflective member is adhered to the rotary actuator.

8. The disc drive of claim 6, wherein the second side of the reflective 15 member includes diffraction grating along the length of the reflective member.

9. The disc drive of claim 8, wherein the depth of the diffraction grating is about one-fourth the wavelength of light incident to the diffraction grating.

10. The disc drive of claim 8, wherein the reflective member is adhered to a rear portion of a voice coil supported by the rotary actuator.

11. The disc drive of claim 2, wherein the detector comprises a periodic multiphase detector.

12. The disc drive of claim 11, wherein the detector comprises a number of photodiodes arranged in a plurality of arrays, wherein the photodiodes are spaced at a width selected to be less than the period of the diffraction grating.

13. In disc drive of the type having a rotatable disc, a controllably positionable head supported by a rotary actuator and a servo circuit for controlling the position of the head relative to tracks on the disc defined by servo data on the disc, a method for self-writing the servo data to the disc without use of external reference comprising steps of:

(a) mounting a clock head assembly adjacent the disc;

(b) using the clock head assembly to write a circumferentially extending clock pattern to the disc and to subsequently read the clock pattern to identify the angular position of the disc;

(c) mounting a radial position detection assembly adjacent the actuator;

(d) using the radial position detection assembly to identify the radial position of the head relative to the disc;

(e) writing the servo data to the disc in relation to the angular position of the disc and the radial position of the head; and (f) containing the clock head assembly and the radial position detection assembly within the disc drive during subsequent field use of the disc drive.

14. The method of claim 13, wherein the clock pattern is written to a texturized landing zone upon which the head comes to rest when the disc drive is deactivated.

15. The method of claim 13, wherein the using step (b) comprises steps of:

(b1) initiating a sweep of the rotary actuator through a full extent of movement;

(b2) counting a number of optical images as a rear portion of the rotary actuator rotates in close proximity with the radial position detection assembly;

(b3) stopping the sweep of the rotary actuator at a movement limit;

(b4) correlating a total number of images registered by the radial position detection assembly as a function of known physical dimensions of the rotatable disc; and (b5) storing the correlation within a memory for subsequent retrieval while writing servo data to the disc.

16. A disc drive comprising:

a controllably positionable head adjacent a rotatable disc; and means for self-writing servo data to the disc by generating an angular position signal indicative of disc angular position, generating a radial position signal indicative of head radial position, controlling the writing of the servo data in response to the angular and radial position signals, and remaining contained within the disc drive during subsequent field use of the disc drive by a user.

* * * * *